United States Patent

[11] 3,578,143

[72] Inventor Benjamin W. Woodward
 Kenmore, N.Y.
[21] Appl. No. 852,232
[22] Filed Aug. 22, 1969
[45] Patented May 11, 1971
[73] Assignee Sperry Rand Corporation
 New York, N.Y.

[54] CONTROL SYSTEM
 9 Claims, 9 Drawing Figs.
[52] U.S. Cl. .................................................. 198/40,
 198/158, 271/64, 312/223
[51] Int. Cl. .................................................. B65g 43/00
[50] Field of Search .................................. 198/40,
 158; 312/223, 268, 266, 267; 271/64; 198/154

[56] References Cited
 UNITED STATES PATENTS
3,224,825 12/1965 Sturgis et al. .................. 312/268X
3,317,029 5/1967 Goldammer et al. .......... 198/158

Primary Examiner—Joseph Wegbreit
Assistant Examiner—Bruce H. Stoner, Jr.
Attorneys—Marshall M. Truex, Frank A. Seemar and Thomas P. Murphy ABSTRACT: A system for automatically controlling mechanized filing equipment including a conveyor for moving one or more article carriers along a predetermined path. Selective carrier positioning for access at a work station is effected by entering appropriate input commands. Corresponding control signals are accordingly initiated that ultimately determine the interval during which the conveyor drive is operative. To this end, coarse and fine control arrangements are interrelated to energize motor drive circuitry and achieve accurate carrier positioning.

INVENTOR.
BENJAMIN W. WOODWARD
BY Frank A. Seemar
ATTORNEY

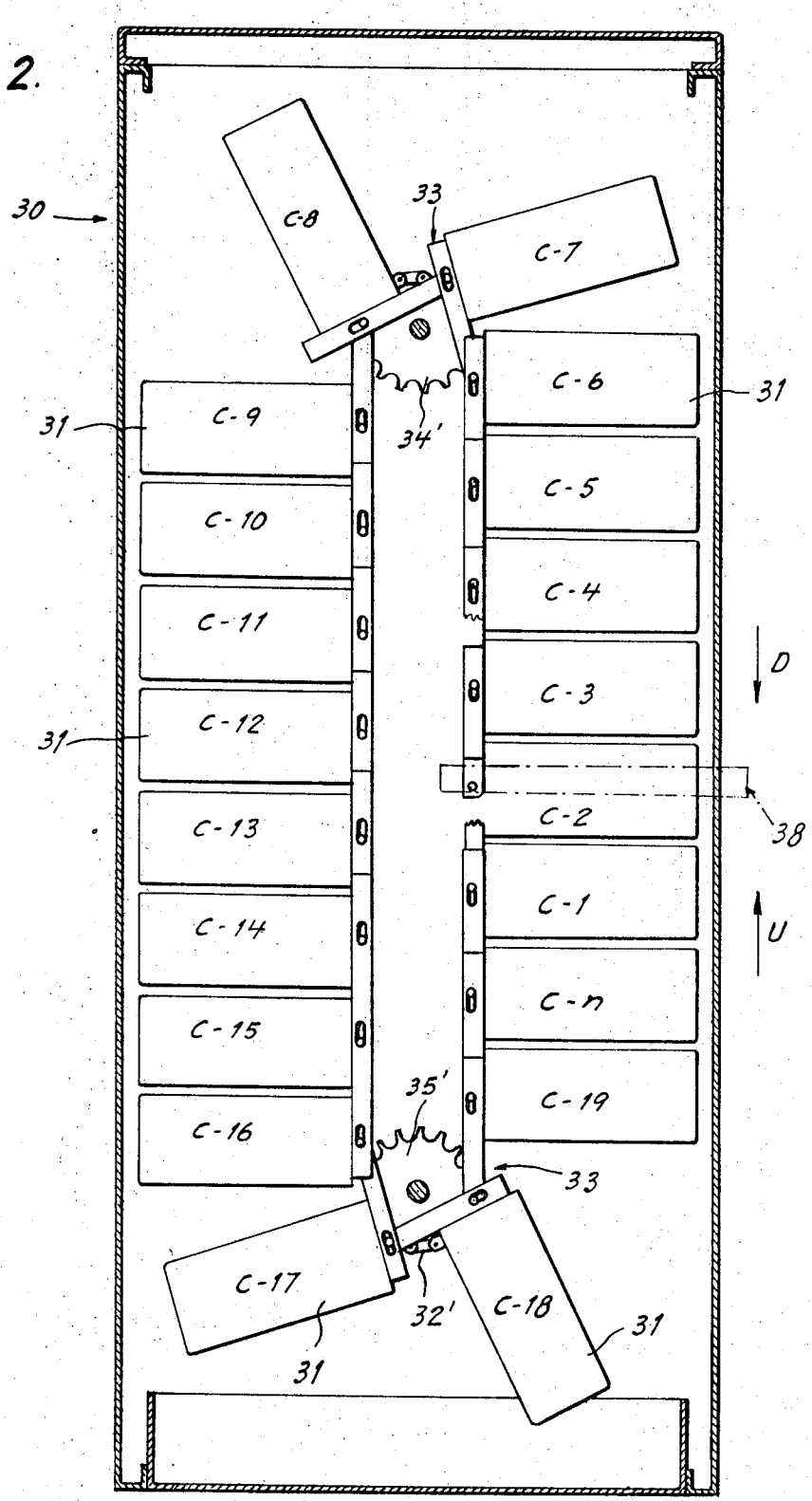

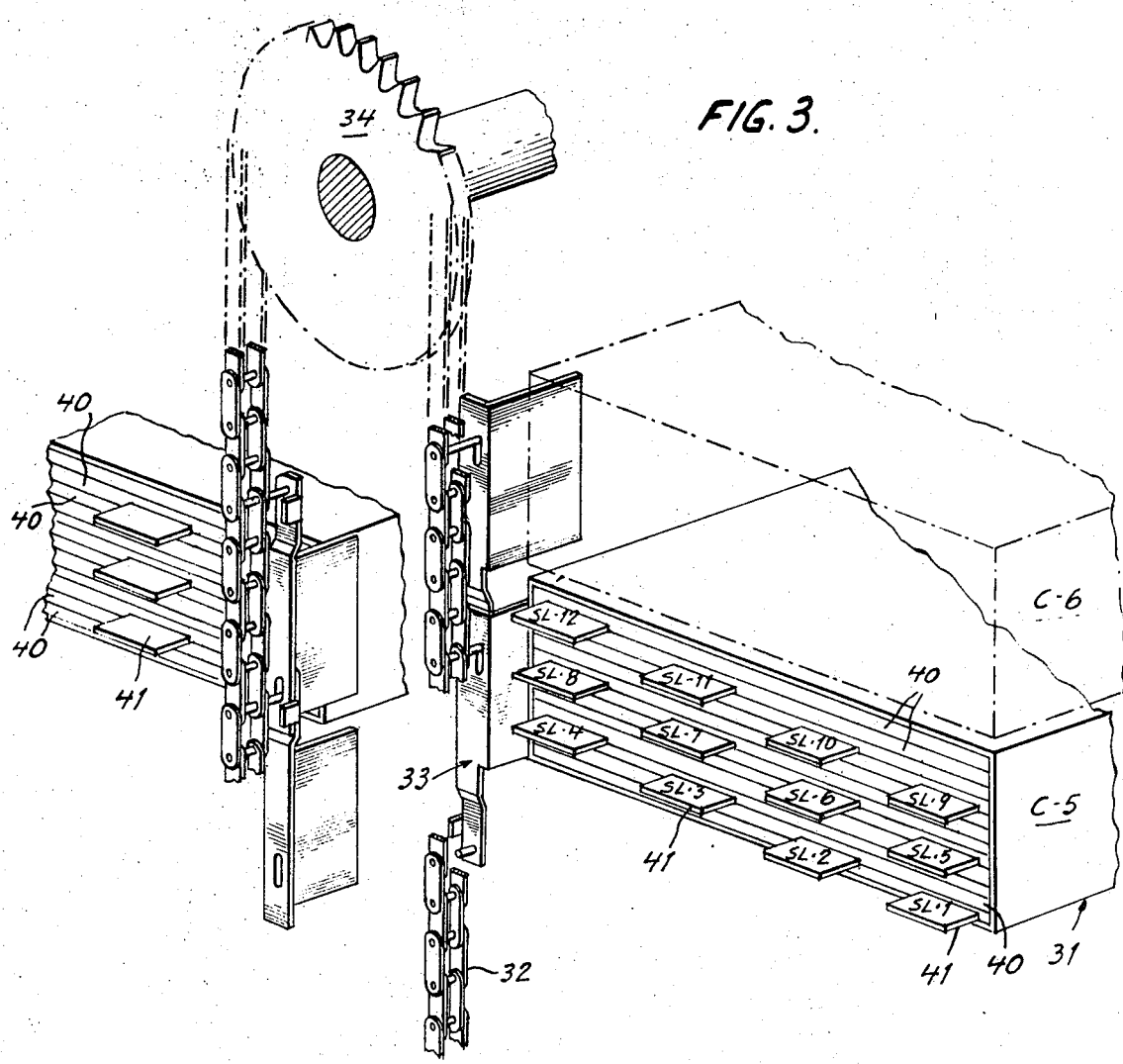

CONTROL SYSTEM

BACKGROUND OF THE INVENTION

The present invention is directed to new and useful improvements in controls for mechanized filing equipment, and more particularly to an automatic selection and positioning system for rotary conveyor type machines. Equipment of this type is shown in U.S. Pat. No. 3,317,019 which issued on May 2, 1967 to a common assignee.

Automated conveyor equipment for article filing and retrieval is commonly used in modern day offices for convenient reference to records peculiar to the business involved. There is also wide spread use of this type of equipment in institutional facilities such as hospitals, libraries, and banks, to name a few. Still further, the convenient referencing capability is a desirable feature in various inventory applications from warehousing operations to retail outlets.

More specifically, conveyor-type equipment for automatic article filing and retrieval is generally well known wherein a plurality of carriers are suspended in ferris wheel fashion from a pair of spaced roller chains. In prior art devices of this type, the chains are each trained about a pair of vertically spaced sprocket wheels arranged to accommodate the chains whereby the carriers are adapted to move in a vertical path past a work station at which the carriers become accessible to an operator. Appropriate controls are coupled to a drive motor whereby selective accessibility to the carriers is made possible by deenergization of the motor in accordance with suitable input information. In many instances, it is desirable for a carrier to have several segments or compartments which necessitates manual selection of a desired portion of the carrier positioned at the work station. To this end, articles in a particular segment of a selected carrier may be made exclusively available at the work station if the control system is adapted for incremental positioning thereof.

Therefore, an object of the present invention is to provide a novel control system for accurately positioning a rotary conveyor having article carriers suspended therefrom. In the past, systems with a relatively small number of carriers have successfully accomplished such positioning function by employing brush and commutator arrangements. However, as the number of desired access positions increases the physical size of a commutator/brush combination becomes impractical, if not impossible. For example, a system having 100 carriers may, in some applications, be more useful with 10 distinct access positions (corresponding to carrier segments or compartments) for each carrier. This increased capability accordingly increases control functions tenfold over the original system having 100 access positions, corresponding to the individual carriers.

Thus, another object of the present invention is the provision of a control system whereby any one of a relatively large number of suspended article carriers guided along an endless path may be selected and precisely positioned without utilizing a correspondingly large number of commutator brushes or other contacts.

A further object is to provide a control system for rotary conveyor filing and retrieval equipment in which incremental positioning of a selected carrier segment is effected in conjunction with primary positioning of the carrier.

SUMMARY OF THE INVENTION

The present invention contemplates new and improved controls for mechanized apparatus having a conveyor adapted to guide a plurality of compartmental carriers in a predetermined path through a work station whereat a selected carrier compartment is made accessible.

In one embodiment the control system comprises circuitry connected to a drive motor operatively coupled to the conveyor, and a primary device for sensing conveyor position in increments corresponding to the number of carriers spaced therealong. A secondary device is provided for sensing subincrements along the path, which subincrements correspond to compartments in any carrier which is selected in conjunction with the primary sensing device. Thus, introduction of a coded input signal corresponding to or identifying a selected compartment in a designated carrier initiates coarse and fine control for ultimate positioning of the conveyor, by virtue of means coupling the primary and secondary sensing devices to interruption circuitry controlling motor energization.

The foregoing and other objects, features, and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes only and are not to be construed as defining the limits of the invention.

BRIEF DESCRIPTION OF THE DRAWINGS

FIG. 2 is a front cutaway elevational view of apparatus of the type shown in FIG. 1.

FIG. 3 is a perspective view showing specific details of the FIG. 1 apparatus.

DESCRIPTION OF THE PREFERRED EMBODIMENT

Figure 1:
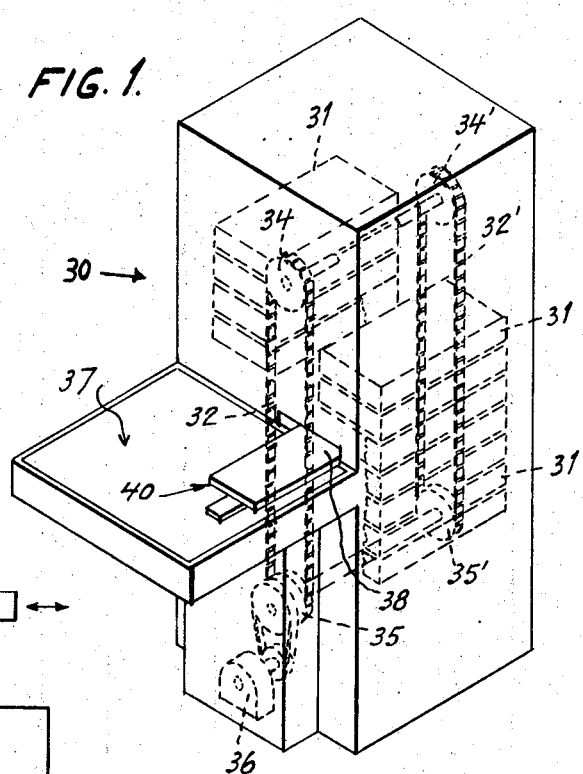
FIG. 1 is a perspective view schematically illustrating apparatus in which the present invention may be utilized.

Now referring to the drawing for a more detailed description, a mechanized filing and retrieval unit, generally designated by reference numeral 30, is shown in FIG. 1 to illustrate by way of example, one embodiment of equipment in which the present invention may be employed. Unit 30 comprises a generally rectangular shaped housing supporting therein a conveyor system including a plurality of article carriers 31. The carriers are suspended from a pair of spaced roller chains 32, 32' by interconnecting linkage arrangements 33, 33' (see FIG. 2). Roller chains 32, 32' are trained about a pair of vertically spaced sprocket wheels 34, 35, and 34', 35', respectively. Drive means, generally designated by reference numeral 36 (FIG. 1), initiated by appropriate commands, e.g., manual keyboard entry, selectively moves chains 32, 32' which are adapted to advance carriers 31 along an endless loop path which passes a work station 37 whereat the contents of a selected carrier are made available through an access opening 38.

Each carrier is divided into a like plurality of individual segments characterized by compartments for receiving vertically spaced panels or slides 40 (FIG. 3), having handle projections 41 adapted to facilitate automatic or manual panel withdrawal from the carrier. Panels 40 are of any well-known construction and may contain or receive thereon any suitable information or information carrying media whereby alphabetical listings, or the like, may be arranged according to the particular needs of users. As illustrated in FIG. 1, panels 40 are slidably received in associated carriers and adapted to be selectively translated between work station 37 and carriers 31.

Accurate positioning of a particular panel 40 at access opening 38 is controlled by the novel system with which the present invention is concerned and the withdrawal and filing method as well as the apparatus employed therefor is not a part of the present invention. Therefore, for the purposes of the following description, it can be assumed that an operator manually manipulates the panel presented at the work station, subsequent to accurate positioning thereof. The unit shown in FIGS. 1—3 is described in further detail, in U.S. Pat. No. 3,317,029. The present invention involves a control system for apparatus typified by such unit.

Now turning to an important principal of the present invention, referred to above as the secondary sensing function for positioning a selected carrier, a system is provided whereby carrier segments are exclusively made available to an operator. The primary positioning mechanism, and associated system for selection of a carrier, is functionally referred to as "coarse" positioning, as opposed to "fine" carrier positioning. This primary control function, however, is no less accurate than the secondary control function but merely is capable of stopping at a lesser number of predetermined increments. Thus, each interval of drive controlled by the primary system results in accurate positioning of a known one of the carrier compartments at the work area access position. Likewise, the subsequent incremental stop positions under primary control would be such that the like compartments in the next selected carriers would be accessible.

Figure 4:
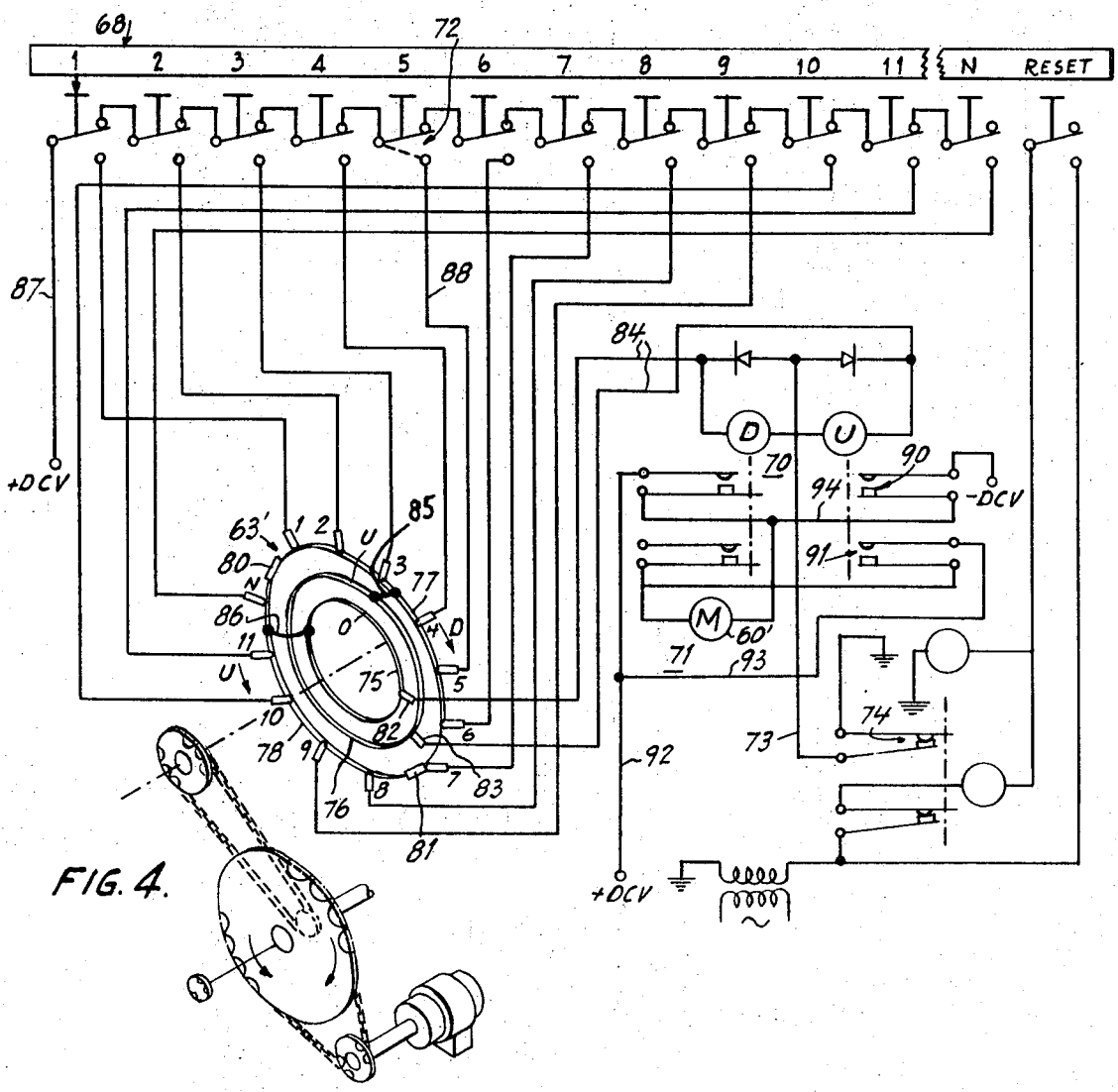
FIG. 4 is a schematic diagram showing a portion of the motor control circuitry and other interrelated mechanisms.

Insofar as primary control is concerned, FIG. 4 shows circuitry in which a commutator and brush arrangement is utilized to selectively position a mechanism such as a conveyor, in response to input commands corresponding to increments (or multiples) of motor shaft rotation. Details of circuit operation will be discussed hereinbelow with reference to the filing and retrieval unit 30 described above.

Control of the conveyor is transferred to a secondary system upon completion of the primary control function. In this regard, pulses are generated in accordance with a slotted disc assembly 42, shown in FIGS. 5 and 6. Rotation of a disc 43 mounted on a shaft 44 by means of a hub member 45 is effected via a gear member 46 keyed to shaft 44. An electro-optical arrangement 47 is mounted on bracket 48 whereby a light source 50 and a light sensor element 51 are mounted in opposition on different sides of the outer periphery of disc 43. This arrangement permits light rays beaming from source 50 to pass through slots 52, 53, 54, 55, 56...n and impinge upon sensor element 51 to thereby develop a series of pulses directly proportional in width to the segmental width of the slots, and directly proportional in frequency to the shaft speed. In the configuration shown, there are four intermediate slots corresponding to subincrements of the rotation of shaft 44 which is rotatably coupled to drive means 36 (FIG. 1). Thus, depending upon ratios desired, the mechanical coupling can be readily designed whereby each large slot 56 (designated 0-Position) corresponds to a carrier rest position at which primary control is deactivated and secondary control takes over to position the selected carrier at any one of four intermediate positions. The number of subincrement slots can be varied according to the number of slides in a carrier. For example, in the carrier shown in FIGS. 3, the 12 slides would require 11 intermediate slots in disc 43.

Figure 7:
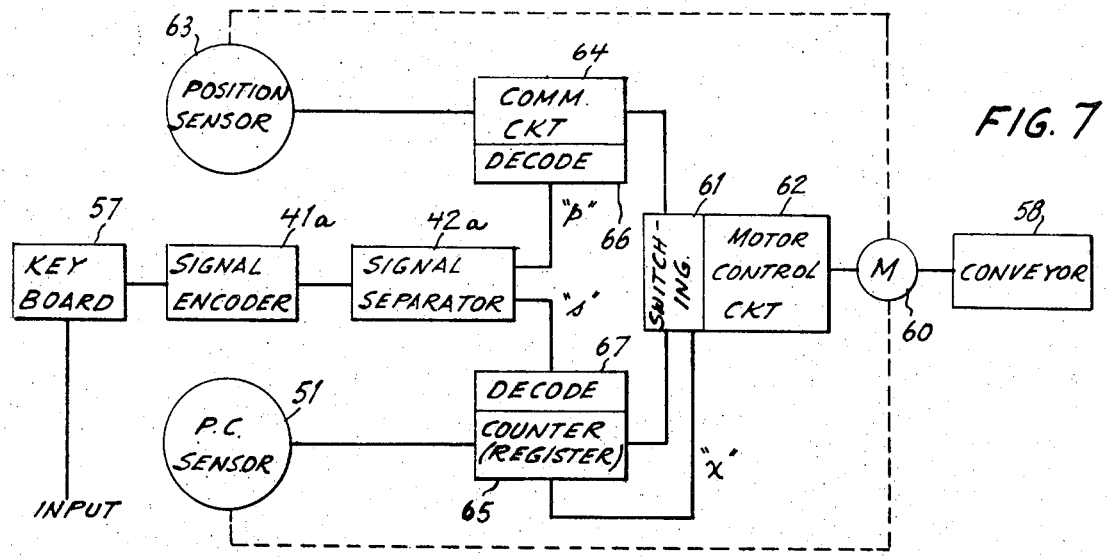
FIG. 7 is a block diagram showing the basic elements of a system embodying the present invention.

In FIG. 7, a block diagram is depicted which will now be described for general familiarity with the system, prior to an explanation of overall operation of the system in response to a hypothetical request by an operator. Many features of the invention are present in the diagrams of circuitry disclosed in FIGS. 4, 8, and 9; however, it should be apparent from the following description of the FIG. 7 block diagram that there are many equivalent circuits which could function in a similar manner for the purposes of the present invention. Several such substitutions are mentioned throughout this description as exemplary cases of such equivalency.

The overall system contemplates apparatus in which information is introduced at keyboard 57 (FIG. 7). An input signal is derived from this information whereby conveyor 58 is positioned by motor 60 such that a selected panel 40 (FIG. 3) is made accessible at work station 37 (FIG. 1). The input signal may be encoded by encoder 41 if necessary to adapt the input signal to the circuitry of the system. Signal separator 42 divides the encoded signal into primary and secondary control portions $p$ and $s$, which are routed to respective primary and secondary control arrangements, the ultimate function of which is to cooperatively energize motor 60. Primary control is effected by decoding (if necessary) signal $p$ whereupon switching array 61 permits motor control circuit 62 to energize motor 60 and selectively position a carrier on conveyor 58 in accordance with position sensor 63. Deenergization is effected at such time as sensor 63, which in the preferred embodiment comprises a commutator and brush combination, senses the selected position of conveyor 58 and deenergizes motor 60 via commutator circuit 64, switching array 61 and control circuitry 62.

Figure 5:
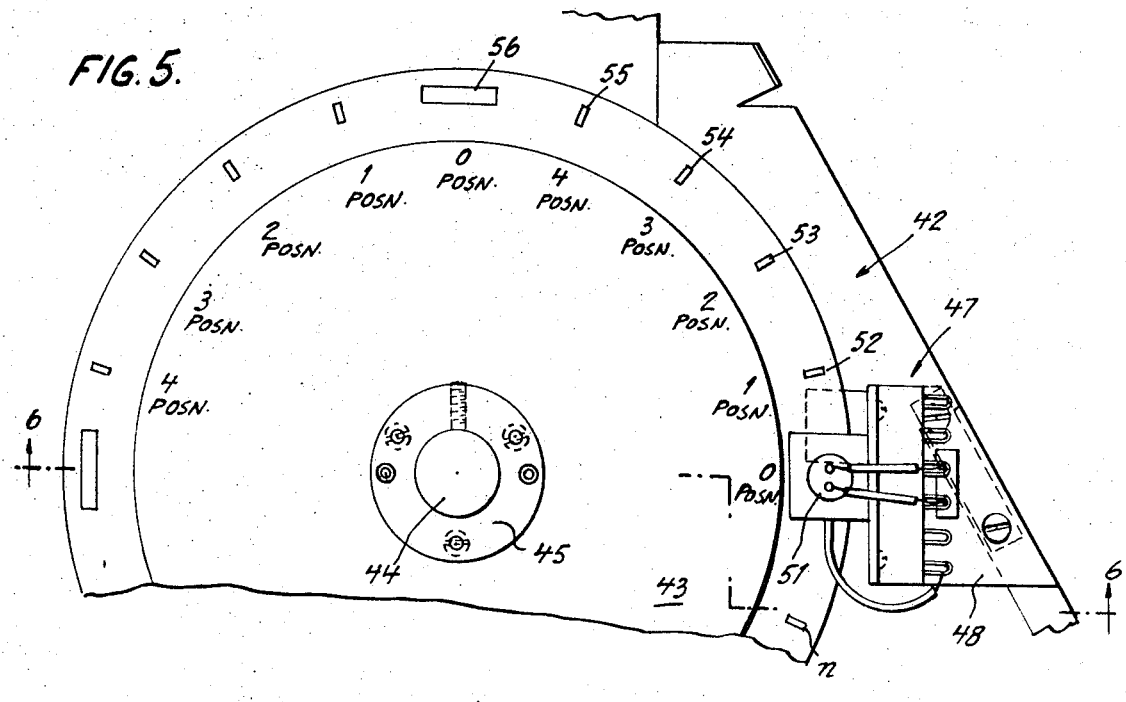
FIG. 5 is a partial plan view showing a portion of the position sensing mechanism of the present invention.
Figure 6:
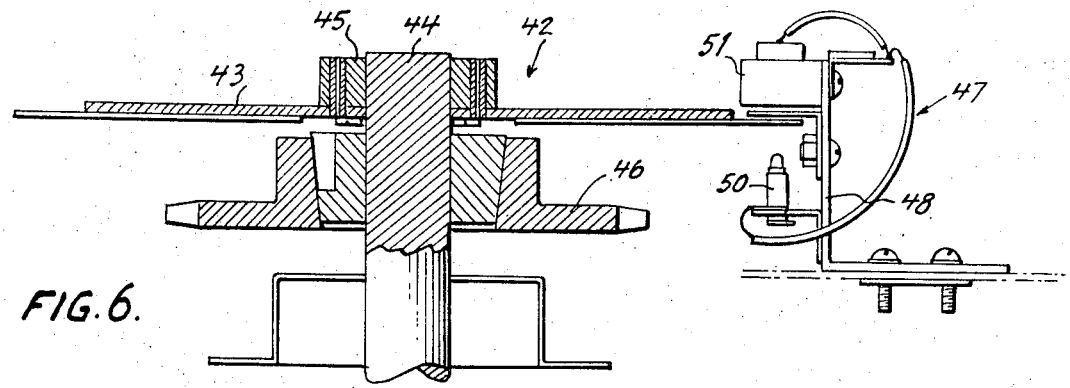
FIG. 6 is a fragmentary sectional view taken along lines 6—6 of FIG. 5.

A significant feature is embodied in the transference of operation to the secondary control arrangement which is adapted to continuously sense subincrements via photocell sensor 51 (FIGS. 5 and 6). Signal $s$, representing a particular panel location common to all carriers, is employed under conditions where a specific carrier has been positioned by the primary control arrangement. Signal $s$ is initially decoded (if necessary) and diverted to a counter 65 which is accordingly "set." The signal pulses from sensor 51 are fed to counter 65 only after a switching signal, $x$, has transferred motor control to secondary operation. In this manner, motor reenergization takes place under control of the secondary arrangement, and conveyor 58 is advanced until such time as sensor 51 introduces a pulse corresponding to the desired panel. Counter 65 produces a signal which thereby deenergizes motor control circuit 62, whereupon the selected panel is accurately positioned for exclusive access at work station 37.

A further understanding of the above described apparatus can best be gained by the following operational explanation. Assume for the purposes of such explanation that an operator of unit 30 (FIG. 1) desires to review information stored on a panel designated SL-3 (FIG. 3) and which is stored in a carrier designated C-5. The carriers are identified in FIG. 2 for the purposes of this description. Likewise, FIG. 3 shows carrier C-5 (in the position shown in FIG. 2) having 12 slides appropriately identified. In the end analysis, carrier and slide identification may comprise coded designators of any type convenient for the intended application. The slide identity may in many instances have significance or be cross referenced to a filing system, e.g., social security numbers, license numbers, etc. but regardless of the identifying arrangement the array of slides and carriers are physically positioned relative to each other in a known manner.

The operator enters a command by sequentially pressing typical input keys 5 and 3, which may be located remotely or (in the embodiment shown) at the work station 37 shown in FIG. 1. Of course a larger system would require the entry of a series of digits, such as 1-5-1-2 indicating the fifteenth carrier and the twelfth slide. In the instant problem, the 5 is a primary command and the 3 is a secondary command. As the number of digits for each command is increased, appropriate means may be required to distinguish the various digits. This is readily accomplished by utilizing an alpha-numeric system in any one of several way, e.g., letter designation for the carrier and numerical numbering for the slide positions within the carriers, or visa versa.

Figure 9:
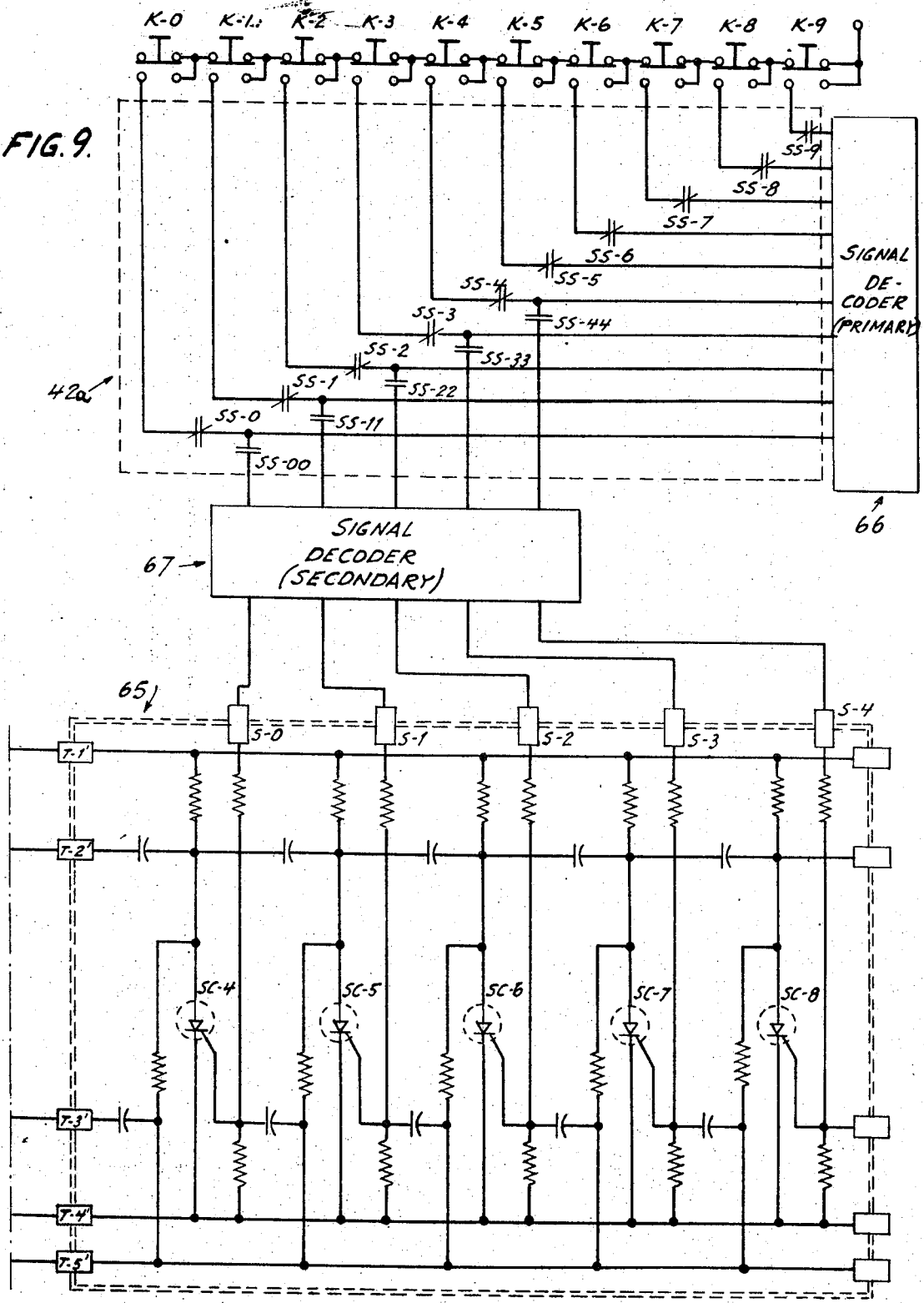

Turning again to the primary control system which involves the positioning of a selected carrier (C-5 in instant example), FIG. 9 shows a digital keyboard having 10 entry positions, K-0 through K-9. Key K-5 is depressed and a signal is switched via separator 42 to a primary signal decoder 66. It should be noted that for the purposes of the present example only five digits (B 0-4) are utilized to identify panel positions. Therefore, upon closure of switch contacts SS-5, key K-5 can only be utilized as a primary command. The signal separation function permits sequential switching of first an input to the primary signal decoder by virtue of the state of initially normally open contacts SS-00 through SS-44 and normally closed contacts SS-0 through SS-9. Following primary signal input the state of the mentioned contacts SS-00 through SS-44 are reversed and any secondary signal inputs are thereby routed to secondary signal decoder 67, under conditions where the depression of key K-3 introduces a signal via closed contacts SS-3 and SS-33. Although this diagram is simplified for the purposes of expediency, it should be understood that the encoding of signals at the keyboard facilitates the presentation of serial information that is adapted to be programmed through signal separator 42 whereby the appropriate encoder receives the input signal exclusively destined therefor. The signal output from primary decoder 66 represents a particular brush in a commutator device and is coupled to switch bank 68 (FIG. 4) to activate a switch associated with such brush. For example, depression of input keys K-5 and K-3 would first activate a switch associated with brush 5. The secondary encoder 67 subsequentially pulses terminal S-3 of counter 65 (FIG. 9), which information is stored until the primary control function is completed.

Switch bank 68 is illustrated as mechanically operative switches but an electronic switching array could be readily substituted without affecting the scope of the primary control function which involves the electrical selection of a wiring loop. In the present example, switch arm designated by bank numeral 5 would be actuated to the position shown in phantom. REferring generally to the wiring diagram of FIG. 4, the circuit comprises a relay loop 70 and a motor loop 71 and in the circuitry of loop 70 is included a commutator 63'. The commutator is connected in circuit with the selected switch 72. Commutator 63' also is connected to "Down" and "Up" relay coils D and U respectively, which are grounded through line 73 and switch 74 in loop 70. Commutator 63' is made up of inner and outer electrically conducting continuous rings 75 and 76 also designated as D and U respectively. The outer split ring is made up of ring segments 77 and 78, each of which is adapted for sliding engagement with brushes designated 1 to N and connected to switch bank 68. Each segment is insulated from the other by insulator sections 80 and 81. All three commutator rings rotate in unison in the desired directions, either counterclockwise or clockwise, corresponding to up and down conveyor directions at the work station, as designated by the arrows U and D respectively (FIG. 4). The number of brushes or contacts are readily designed to correspond to the C-1 to C-n carriers 31, as designated in FIG. 2, and which carriers move up or down in the directions designated by the arrows U and D illustrated in FIG. 2 in response to commutator 63'. The spacing between the brushes is proportional to the spacing between the carriers 31. The commutator 63' is mounted, with respect to the brushes or contacts 1 to N, so that insulator 81 will always be disposed under the brush of the selected carrier located at the access position. Insulator 80 is positioned on commutator 63' so as not to align with a switch brush when a carrier is stopped at the access position. The brushes or contacts 82, 83 engage the ring segments 75 and 76 and these brushes or contacts 82, 83 are connected respectively with the D and U relay coils through the lines 84. The outer U complete ring 76 is connected to the outer ring segment 77 of the commutator 63' by a connector 85, while the inner D complete ring 75 is connected to the outer ring segment 78 by a connector 86.

Line 87 is connected to a source of electrical energy or a DC power source and also is connected to switch bank 68 and by means of series connections between the switches, current is made available so that when any of the series connected switches is operated to close its normally open contacts, the current is removed from all succeeding switches.

For the purpose of illustration let us assume that file carrier C-7 is at working position with insulator 81 disposed beneath brush 7 and that the operator wishes file carrier C-5 brought to the access position. Operation of switch 5, as designated by the indicator, will supply current to brush 5 through line 88, ring segment 77, connector 85, ring segment 76, contact 83, and line 84 to the relay coil U which will close the normally open relay switches 90 and 91 with the result that a circuit will be established through motor circuit lines 92, 93, switch 91, line 94 and switch contacts 90 of loop 71 from a power source to cause the motor 60' to move the conveyor up in the direction designated by arrow U in FIG. 2. This operation of the motor will revolve the commutator through the U-ring in the direction of arrow U in FIG. 4 to bring the insulator section 81 beneath the brush 5 and so stop the motor with the carrier C-5 at the desired position.

Having the selected carrier positioned at the work station secondary control of motor 60' is effected and control thereof is maintained in accordance with pulses determined by slotted disc arrangement shown in FIGS. 5 and 6. The carriers are accurately located (when the primary control deenergizes the motor) at panel SL-1 or zero position of the counter and disc. Thus, if the lowermost slide is desired the secondary control mechanism is not required. REferring to FIG. 5 the wide slots designated by 0 occur at each occurrence of a carrier at the access position, by virtue of predetermined proportional mechanical coupling. If a slide other than the lowermost one is desired, the motor is energized and moves the conveyor in increments corresponding to slides in the carrier Reenergization of the motor takes place by sensing the primary stopped condition by known electro-optical means, or the like, (not shown) and reenergizing the control circuit via the below described method by means generally comprised of digitally counting the carrier incremental position by sensing the corresponding light pulse as it passes through the slots in disc 43. This secondary control will now be explained in detail be reference in particular to FIGS. 8 and 9.

A signal voltage is present at signal terminal S-3 by virtue of prior depression of key K-3 and the secondary signal decoder function. When control is transferred under conditions where termination of primary function is sensed, a voltage is presented at terminal T-8 (FIG. 8) whereupon silicon controlled rectifier SC-2 is fired and relay coil ST is supplied with current which will close appropriate normally open switches with the result that the motor will again become energized and drive the conveyor in a down direction at a relatively slow speed. Coil ST will also close normally open contacts ST-1, thus permitting light sensor LS to be conductive under conditions where light impinges thereupon emanating from light source L in a manner described in detail in the above discussion of FIGS. 5 and 6. As the drive motor starts driving the conveyor, disc 43, coupled for rotation therewith, permits periodic light ray signals to derive pulses at terminal T-7, resulting in the firing of silicon controlled rectifier SC-1. Accordingly, transistor Q-1 is turned on to present a signal pulse at terminal T-5. This signal is of sufficient magnitude to fire silicon controlled rectifier SC-6 in a conventional manner under conditions where SC-7 is conducting. Likewise, SC-5, SC-4, and SC-3 are fired in successive order when pulses are sequentially presented at terminal T-7 as a result of the shuttering of disc 43' (FIG. 8) with respect to L and LS, as discussed above. When SC-3 is fired transistor Q-2 is turned on causing relay coil STP to conduct, which in turn results in deenergization of the motor, and thereby stopping the conveyor at the selected panel position.

Figure 8:
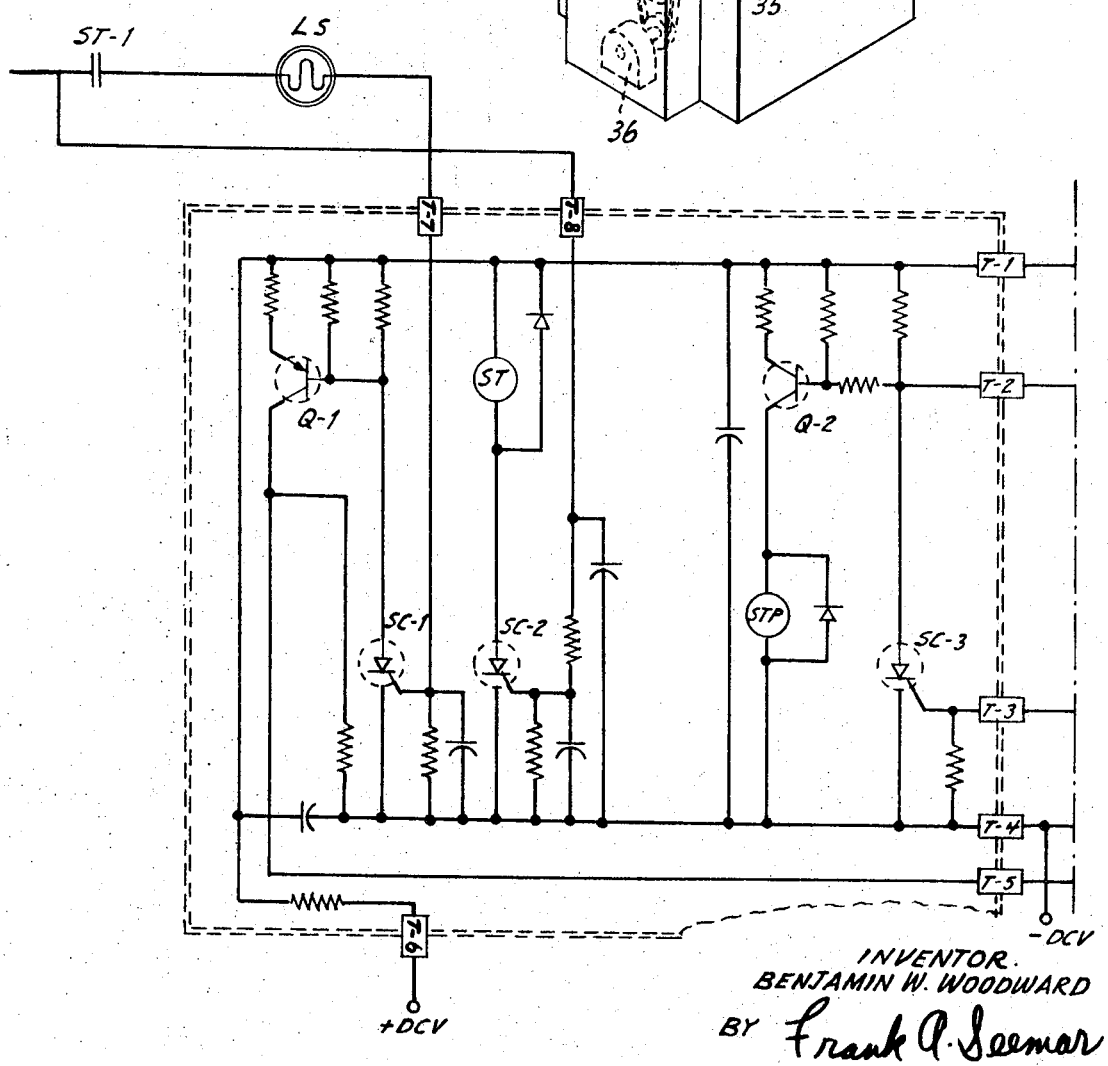
FIGS. 8 and 9 are electrical schematic diagrams showing circuitry that may be used in the system shown in FIG. 7.

The circuitry of FIGS. 8 and 9 is merely exemplary of a counting arrangement associated with slotted disc 43 to accomplish the novel secondary control function. It should now be apparent that the novel principal involved could readily be employed to effect tertiary control by utilizing a disc having a next order of slots to control positioning in increments between the secondary controlled positions. There is no theoretical limit to the number of discs that could be used in the application of this extended control.

To recapitulate, the primary motor control relay causes the conveyor drive motor to move the commutator in a direction to cause the selected carrier to stop at a predetermined brush, at which time control is transferred to a counter-type circuit. The conveyor is then restarted, rotating a disc having suitable slotted apertures in its periphery whereby electrical pulses are generated by light passing through the slots to a photocell and applied to the counting circuit so as to bring the present count to zero. The slots in the disc chop the emitted light in a frequency directly proportional to the rotation of the conveyor drive shaft, whereby the selected carrier panel is positioned for access when the final count in a shift register (counter 65) is reached. At this time, the conveyor motor relay circuit is opened, stopping the conveyor and closing appropriate panel extraction circuitry relays. Alternatively, the operator may manually extract the selected panel from the carrier by means of outwardly projecting handle 41.

Although a specific embodiment of the invention has been illustrated and described in detail by way of example, it is to be understood that the invention is not limited thereto. Various changes may be made in the design and arrangement of parts without departing from the spirit and scope of the invention, as will be readily understood by those skilled in the art. said light

I claim:

1. Control means for apparatus including a plurality of compartmental carriers conveyed in a predetermined path adjacent to a work station whereat a selected carrier compartment is positioned for access, said control means comprising,
   a. a drive motor coupled to the conveyor,
   b. means for energizing said motor to drive said conveyor,
   c. means for interrupting said energizing means,
   d. primary sensing means for sensing the position of said conveyor in increments corresponding to the carriers spaced therealong,
   e. secondary sensing means for sensing the position of said conveyor in subincrements corresponding to the compartments in a selected carrier,
   f. selection means for introducing input signals corresponding to a particular compartment in said selected carrier,
   g. means coupling said primary and secondary sensing means to said interrupting means and said selection means, whereby said energizing means is interrupted under conditions where said particular compartment is accessible at the work station.

2. Control means as set forth in claim 1 wherein said secondary sensing means comprise,
   a light source,
   light sensing means mounted in operative relationship with said light source, and
   means interposed in the path between said source and said sensing means, for selectively permitting light rays emanating from said source to impinge upon said sensing means.

3. Control means as set forth in claim 2 wherein said interposed means comprise,
   a shutter element having a plurality of spaced openings corresponding to said carrier compartments, whereby light passes through said opening and impinges on said light sensing means which in turn forms subincremental signals for controlling said interrupting means.

4. Control means as set forth in claim 2 wherein,
   said interposed means comprise a shutter element consisting of a dish having a plurality of radially extending slots,
   means are provided for rotatably mounting said disc, and
   means are provided for coupling said disc to said motor for rotation under conditions where said conveyor is being driven, whereby said slots permit said light rays to selectively impinge upon said light sensing means to provide pulses corresponding to said subincrements.

5. Control means as set forth in claim 4 wherein said selection means includes,
   circuitry for providing an input signal divided into primary and secondary portions corresponding respectively to carrier and compartment selection,
   comparison means for comparing said secondary portion and said pulses.

6. Control means as set forth in claim 5 wherein said comparison means comprises,
   a register for receiving said secondary portion and counting said pulses until a quantity corresponding to said secondary portion has been introduced whereupon said interrupting means interrupts said energizing means.

7. Control means as set forth in claim 3 wherein said input signals include,
   a secondary portion designating said particular compartment,
   said coupling means comprise means for accepting said subincremental signals and said secondary portion, whereby said energizing means are interrupted under conditions where a corresponding subincremental signal and secondary portion are present.

8. Control means as set forth in claim 7 wherein said accepting means comprise a shift register.

9. Control means as set forth in claim 8 wherein said secondary portion sets said register whereby the complement of a coded signal representing said particular compartment is present and said subincremental signals are serially presented until a coincidence condition is attained.